Feb. 9, 1971 W. P. FLOHR, JR 3,561,909
STEADY REST FOR GRINDER
Filed March 28, 1968 2 Sheets-Sheet 1
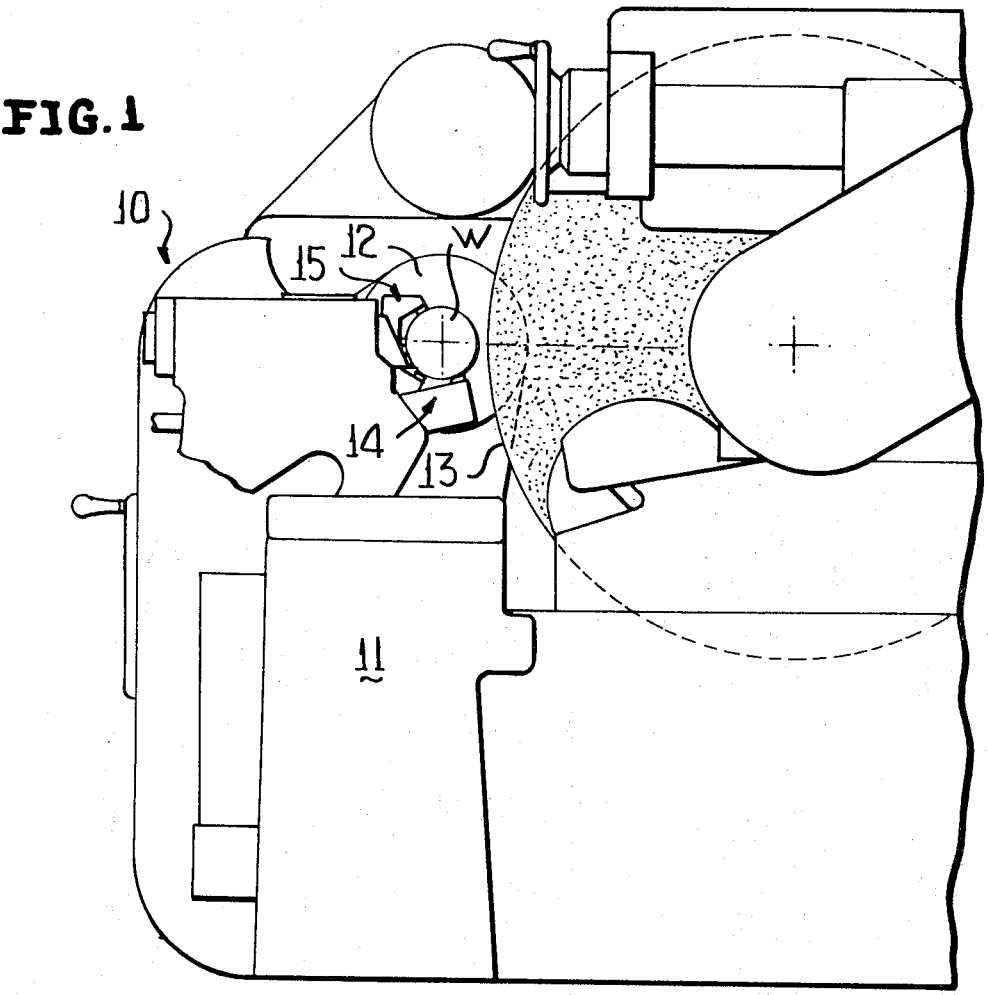
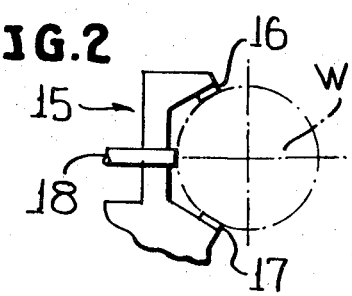
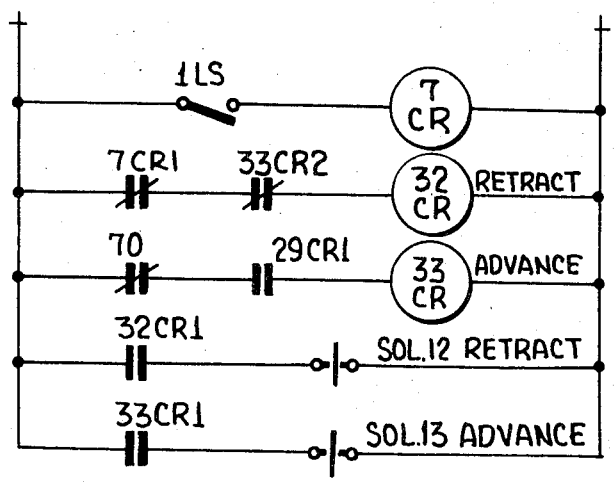
INVENTOR
WILLIAM P. FLOHR, Jr.
BY
Mason, Porter, Diller & Brown
ATTORNEYS

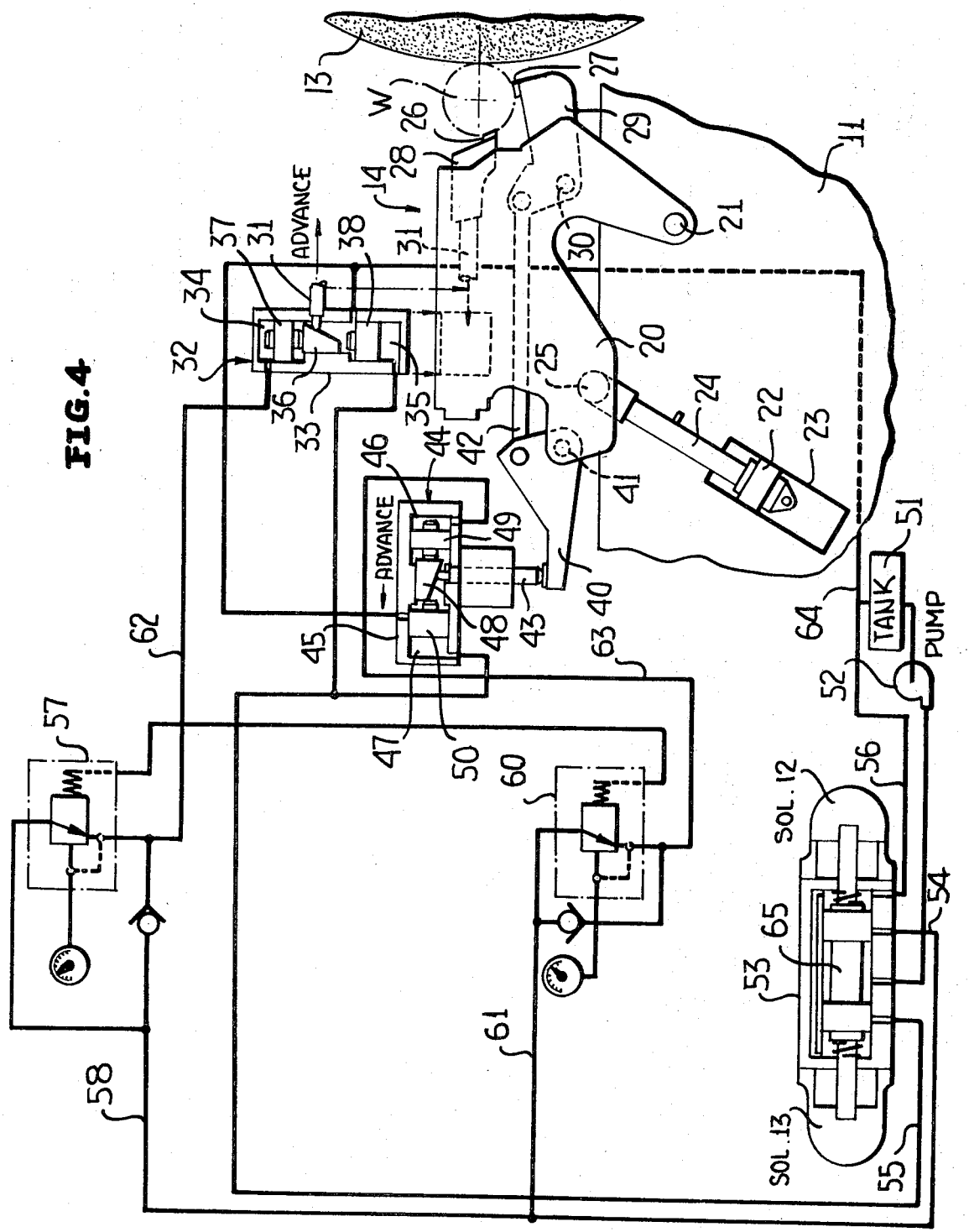

United States Patent Office 3,561,909
Patented Feb. 9, 1971

3,561,909
STEADY REST FOR GRINDER
William P. Flohr, Jr., Waynesboro, Pa., assignor to Litton Industries, Inc., Waynesboro, Pa., a corporation of Delaware
Filed Mar. 28, 1968, Ser. No. 716,716
Int. Cl. B24b 41/06
U.S. Cl. 51—239                                 8 Claims

ABSTRACT OF THE DISCLOSURE

The apparatus of this disclosure relates to steady rest actuating means of the type which includes a pressure actuated floating wedge in engagement with the steady rest plunger. The wedge is shifted in one direction by a hydraulically actuated piston to advance the plunger against the workpiece. It is actuated in the opposite direction for resetting by another hydraulically operated piston. During the grinding operation, the piston is held against the wedge by pressure sufficient to prevent deflection of the work by the advance of the grinding wheel. As initially set up, when the plunger is in contact with the finished diameter on the workpiece, there is some clearance between the reset piston and the head of the cylinder. As the steady rest shoe wears, the actuating wedge will move farther to the right to advance the plunger to compensate for such wear. The clearance between the reset piston and the head of the cylinder permits the movement of the wedge for this compensation. The lower steady rest shoe is actuated in the same manner except a higher pressure is applied to the actuating piston to overcome any sag in the workpiece and to hold the workpiece in a vertical position best suited to maintain roundness of the workpiece.

---

This invention relates to steady rests for supporting workpieces during a machining operation, particularly a grinding operation.

In the past, steady rests have been advanced and retracted relative to a workpiece by power means, usually hydraulic. However, during a grinding operation, the steady rest shoes are usually maintained in contact with the workpiece by manually actuated means.

More recently, as shown in U.S. Pat. 3,233,368, granted Feb. 8, 1966, apparatus has been provided for advancing steady rest shoes by power during a grinding operation. The device of this patent applies equal pressure to both the upper and lower steady rest shoes. Furthermore, the shoe advancing means is adjusted or limited to an advance position corresponding to the finished diameter of the workpiece. With this arrangement, wear on the shoes causes them to lose contact with the work before final size is reached. The apparatus of the patent makes no distinction between the horizontal force exerted by the feed of the grinding wheel and the vertical force resulting from the grinding action as well as from the weight of the workpiece.

It is, therefore, an object of the present invention to provide means for stopping the advance of the steady rest shoes when final size is reached, while holding the shoes in contact with the workpiece until the grinding wheel has been retracted.

Another object is to apply a different force to each shoe depending on the magnitude of the horizontal and vertical forces acting on the workpiece during grinding.

Still another object of this invention is to provide a steady rest for a grinder which includes steady rest shoes which are disposed in direct contact with the workpiece being ground and wherein the shoes are subject to wear, the steady rest having means for advancing the steady rest shoes as the grinding of a workpiece progresses and the means being capable of advancing the steady rest shoes beyond the normal position of a ground workpiece whereby the wearing of the steady rest shoes is automatically compensated for.

A further object of this invention is to provide a steady rest for a grinder of the type having a gauge which is operable to discontinue the grinding operation when the workpiece is ground to size, the steady rest including steady rest shoes which are engaged with the workpiece surface being ground and are continuously advanced as the workpiece surface is ground away until the gauge indicates that the workpiece has reached the predetermined size, at which time the gauge is also operable to stop the advance of the steady rest shoes and hold the steady rest shoes in position until the grinding wheel is retracted, after which the steady rest shoes are also automatically retracted.

With the above and other objects in view that will hereinafter appear, the nature of the invention will be more clearly understood by reference to the following detailed description, the appended claims and the several views illustrated in the accompanying drawings.

In the drawings:

FIG. 1 is a partial end elevational view of a shaft grinder having portions thereof broken away and shown in section and shows the general relationship of the steady reset with respect to the grinding wheel, the workpiece and the gauge for sizing the surface of the workpiece being ground.

FIG. 2 is a schematic showing of a standard chord-type sizing gauge.

FIG. 3 is a schematic of the electrical circuit for controlling the operation of the steady rest.

FIG. 4 is a schematic view showing generally the structural details of the steady rest and the hydraulic system of operating the various components thereof.

Referring now to FIG. 1 in particular, it will be seen that there is illustrated a shaft grinder, which is generally referred to by the numeral 10. The shaft grinder 10, except for the steady rest, which is the subject of this invention, is of a conventional construction and among other features includes a bed 11. There is suitably supported by the bed 11 conventional workpiece supports including a chuck 12 at the head end of the grinder. The work supports support a workpiece W in a substantially horizontal position. The grinder 10 also includes a grinding wheel 13 which is preferably mounted for rotation about an axis parallel to the axis of the workpiece W and which is also mounted for movement towards and away from the axis of rotation of the workpiece W. In the operation of the shaft grinder, the grinding wheel 13 is advanced in a manner not a part of this invention to effect the necessary grinding of a portion of the workpiece W, after which it is retracted.

It will be readily apparent that during the grinding of the workpiece W by the grinding wheel 13, certain forces, both horizontal and vertical, will be imposed upon the workpiece W so as to tend to offset the axis of the workpiece portion being ground from the true axis of rotation of the workpiece. In addition, gravitational forces on the workpiece have a tendency to effect a sagging of the workpiece so that in addition to the vertical force applied to the workpiece by the grinding wheel, one must also consider the vertical gravitational force when supporting the workpiece surface against deflection during a grinding operation. It will be readily apparent that the horizontal force will not be the same as the vertical force and in most instances the vertical force will be greater than the horizontal force.

In order to support the portion of the workpiece being ground during the grinding operation, the shaft grinder 10 is also provided with a steady rest, which is generally referred to by the numeral 14. The steady rest 14 is suitably mounted on the bed 11 of the shaft grinder 10 in the manner schematically shown in FIG. 4.

The shaft grinder 10 also includes a gauge, which is generally referred to by the numeral 15 and is clearly illustrated in FIG. 2. The gauge 15, which is of a conventional construction, has a generally U-shaped arrangement and includes a pair of shoes 16, 17 which ride on the workpiece surface being ground. In addition, the gauge 15 includes a centrally located plunger 18 which engages the workpiece surface and is movable by the workpiece surface directly in proportion to the diameter of the workpiece in a conventional manner so as to permit a determination of the diameter of the workpiece.

Referring now to FIG. 4 in particular, it will be seen that the steady rest 14 includes a steady rest positioner frame 20 which is pivotally mounted on the bed 11 by means of a pivot 21. The frame 20 is positioned by means of a piston 22 which is mounted within a cylinder 23 and which is connected to the frame 20 by means of a piston rod 24 having a pivotal connection with the frame 20 as at 25. It is to be understood that the piston 22 is operable to move the frame 20 from its illustrated operable position of FIG. 4 to a retracted out of the way position to facilitate the mounting and removal of a workpiece W relative to the shaft grinder 10. The means for engaging and supporting a workpiece W during a grinding operation by the grinding wheel 13 includes an upper shoe 26 and a lower shoe 27. The upper shoe 26 is carried by a support 28 which is mounted in the frame 20 for horizontal sliding movement toward and away from the workpiece W. On the other hand, the lower shoe 27 is carried by a support 29 which is pivotally mounted in the frame 20 for pivoting about a pivot pin 30 with the movement of the shoe 27 relative to the workpiece W being generally vertically.

The support 28 has a rearwardly extending plunger 31 which is constantly urged away from the workpiece W by a spring means (not shown) and is positioned relative to the frame 20 by a hydraulically actuated positioner which is generally referred to by the numeral 32. The positioner 32, which is mounted within the frame 20, in a generally horizontal position, includes a body member 33 which is contoured at the opposite ends thereof to define cylinders 34 and 35. There is mounted within the body 33 intermediate the cylinders 34 and 35 a wedge 36 with which the plunger 31 is constantly engaged and which wedge 36 determines the position of the shoe 26 relative to the frame 20 by controlling the advancement and retraction of the plunger 31. The wedge 36 is actuated by means of a piston 37 which is mounted within the cylinder 34 while movement of the wedge 36 in a shoe advancing direction is resisted by means of a piston 38 which is mounted within the cylinder 35. The piston 38 may be considered to be a reset piston.

At this time it is pointed out that when the shoe 26 is in its workpiece supporting position, the plunger 31 will normally be engaged with an intermediate portion of the wedge 36 and the piston 38 will be positioned some distance from the closed end of the cylinder 35 so that the wedge 36 will be free to advance further sufficiently to compensate for the wearing of the shoe 26 which naturally occurs due to its contact with the rotating workpiece W while supporting the same.

The pivoting of the support 29 is controlled by a linkage which includes a pivotal lever member 40 which is pivotally mounted on the frame 20 at 41 and which is connected to the support 29 by means of a link 42, the link 42 being pivotally connected at its opposite ends to the support 29 and the lever 40. The lever 40 is, in turn, engaged with a plunger 43 which is positioned by means of a hydraulic actuator generally referred to by the numeral 44. It is to be understood that the linkage for positioning the support 29 includes spring means (not shown) which constantly urges the shoe 27 away from the workpiece W and thus constantly urges the plunger 43 upwardly, as viewed in FIG. 4.

The hydraulic actuator 44 includes a body 45 which is internally configured to define cylinders 46 and 47 at the opposite ends thereof. The intermediate portion of the body 45 is configured to support for sliding movement a wedge 48 with which the upper end of the plunger 43 is constantly engaged.

The wedge 48 is engaged at one end by a piston 49, which is positioned within the cylinder 46, for moving the wedge 48 to advance the plunger 43 and the shoe 27. The opposite end of the wedge 48 is engaged by a piston 50, which is mounted within the cylinder 47 and which piston 50 opposes the advancement of the wedge 48 and is utilized to reset the wedge 48. The piston 50, accordingly, may be considered to be a reset piston.

The positions of the shoes 26 and 27 are controlled by a hydraulic system which includes a fluid reservoir tank 51 to which a pressure pump 52 is coupled. The pressure pump 52, in turn, is connected to a flow control valve 53 which is of a conventional construction and which is capable of selectively connecting the pump 52 to one of two fluid lines 54 and 55 while coupling the other of the fluid lines to a return line 56 extending from the valve 53 to the tank 51. The valve 53 is moved to the selected position by actuating either of the solenoids SOL 12 or SOL 13 positioned at the opposite ends thereof. In addition, the valve 53 has a spring loaded neutral position closing the fluid lines 54 and 55 and sealing off the remainder of the hydraulic system from both the pump 52 and the tank 51.

Fluid flowing through the fluid line 54 serves to advance the shoes 26 and 27 and the fluid line 54 is connected to a conventional pressure reducing valve 57 by means of a fluid line 58 and to another conventional pressure reducing valve 60 by means of a fluid line 61. The pressure reducing valve 57, in turn, is connected to the cylinder 34 by means of a fluid line 62 while the valve 60 is connected to the cylinder 46 by means of a fluid line 63.

It is to be understood that the reducing valves 57 and 60 are adjustable to provide for the selective controlling of the forces applied by the shoes 26 and 27. It is also to be understood that normally the fluid in the fluid line 62 will be at a higher pressure than the fluid in the fluid line 63. Although the specific pressures are immaterial as far as the invention is concerned, it is pointed out here that a typical pressure in the fluid line 62 is 35 p.s.i. while a typical pressure in the fluid line 63 is 85 p.s.i.

It is to be understood that the fluid passing through the fluid line 55 serves to retract the shoes 26 and 27. It is to be noted that the fluid line 55 is connected to the cylinders 35 and 47 and when fluid is supplied under pressure to the fluid line 55, the wedges 48 are moved to their retracted positions permitting the spring means to retract the shoes 26 and 27.

If desired, a suitable drain line 64 may be coupled to the bodies 33 and 45 for draining hydraulic fluid which may escape past the pistons mounted therein. The drain line 64 is connected to the tank 51.

OPERATION

It is to be understood that the grinding of the workpiece W is initiated with the steady rest 14 in a retracted position. After the grinding operation reaches the point where the steady rest is required to support the workpiece W, the frame 20 is advanced by means of the piston 22.

With reference to the wiring diagram of FIG. 3, it is to be understood that when the frame 20 is in position, a signal is provided to close contact 29CR1. This completes a circuit through normally closed gauge contact 70 to energize relay 33CR. Contact 33CR1 then closes to energize the steady rest advance solenoid SOL 13.

Referring now to FIG. 4, it will be seen that the solenoid SOL 13 actuates to shift valve member 65 of the valve 53 to the right, directing fluid under pressure from the pump 52 through the fluid lines 54 and 58 to the reducing valve 57 and thereafter through the fluid line 62 to the cylinder 34. The valve 57 is set to provide a pressure sufficient to support the shoe 26 and the workpiece W against the horizontal forces acting on the workpiece during the grinding operation.

Fluid under pressure from fluid line 54 is also directed through line 61 to the reducing valve 60 and then through line 63 to the cylinder 46. The reducing valve 60 is set to provide sufficient pressure to support the shoe 27 and the workpiece W against the vertical forces acting on the workpiece during a grinding operation. The vertical forces include both the force resulting from the grinding operation and gravitational force on the workpiece.

In view of the fact that the valve member 65 remains in its right-hand position during the grinding operation, as the workpiece W is reduced in size, the shoes 26 and 27 are advanced by their respective wedges 36 and 48 until final size is reached as determined by the gauge 15. At this point, normally closed gauge contact 70 opens to de-energize relay 33CR. Contact 33CR1 opens to de-energize steady rest advance solenoid SOL 13.

When the solenoid SOL 13 is de-energized, the valve member 65 is moved to its neutral position, blocking flow through the fluid lines 54 and 55 and thereby locking the shoes 26 and 27 in their work supporting positions until the grinding wheel 13 is retracted by suitable means (not shown).

The electrical circuitry also includes a relay 7CR which is controlled by a limit switch 1LS. When the grinding wheel 13 is in an advanced position, the limit switch 1LS is closed. Accordingly, relay 32CR remains de-energized although normally closed contact 33CR2 has again closed due to the de-energization of relay 33CR in that normally closed contact 7CR1 is still open.

Retraction of the grinding wheel 13 results in the opening of the limit switch 1LS to de-energize relay 7CR. The relay 7CR operates through suitable controls (not shown and not a part of this invention) to retract the piston 22 and the frame 20 along with the shoes 26 and 27 from work engaging positions. At the same time, normally closed contact 7CR1 closes to complete a circuit to energize relay 32CR.

The energization of relay 32CR results in the closing of contact 32CR1 to energize solenoid SOL 12 with the solenoid SOL 12 shifting the valve member 65 (FIG. 4) to the left, directing fluid under pressure through fluid line 55 into the cylinders 34 and 47 and thereby shifting reset pistons 38 and 50 and their respective wedges 36 and 48 to effect retraction of the shoes 26 and 27.

The shaft grinder 10 is now ready to either shift the workpiece W to grind another portion thereof or permit the replacement of the workpiece with a similar workpiece to be ground.

It will be readily apparent that the manner in which the shoes 26 and 27 are actuated and supported, the shoes will perform their desired workpiece supporting function notwithstanding normal wearing away of the shoes and the fact that the forces required to be exerted by the shoes on the workpiece are different in the shoes.

Although only a preferred embodiment of the steady rest construction and the mechanism for advancing and positioning the shoes thereof has been illustrated and described, it is to be understood that minor variations may be made in the steady rest construction without departing from the spirit and scope of the invention, as defined by the appended claims.

I claim:

1. In a grinding machine of the type including a bed having mounted thereon work supporting means for supporting a workpiece in a generally horizontal position during a grinding operation, and a generally vertically disposed grinding wheel; a steady rest comprising:
   (a) a frame mounted on said bed in opposed alignment with said grinding wheel,
   (b) an upper work engaging member slidably carried by said frame for supporting a workpiece against horizontal forces which occur during a grinding operation,
   (c) a lower work engaging member carried by said frame for supporting a workpiece against vertical forces acting thereon during a grinding operation,
   (d) individual hydraulic means for positioning and holding each of said work engaging members in supporting engagement with a workpiece,
   (e) a supply of fluid under pressure,
   (f) means for separately supplying fluid from said source to each of said hydraulic means,
   (g) and means for regulating the pressure of said fluid supplied to each of said hydraulic means in accordance with the forces acting on said respective work engaging members.

2. The steady rest of claim 1 wherein:
   (a) each of said hydraulic means has a range of movement sufficient to move the respective one of said work engaging members beyond the intended position of a ground workpiece surface whereby there is automatic compensation for wearing of said work engaging members,
   (b) and means for controlling said fluid supplying means to automatically lock said hydraulic means against movement at the end of a grinding operation.

3. The steady rest of claim 1 wherein
   (a) each of said hydraulic means has a range of movement sufficient to move the respective one of said work engaging members beyond the intended position of a ground workpiece surface whereby there is automatic compensation for wearing of said work engaging members,
   (b) first means for controlling said fluid supplying means to automatically lock said hydraulic means against movement at the end of a grinding operation,
   (c) and second means for controlling said fluid supplying means to actuate said hydraulic means to retract said work engaging members after said grinding wheel is retracted relative to the ground workpiece.

4. The steady rest of claim 1 wherein
   (a) said lower work supporting member has greater forces acting thereon than on said upper work supporting member due to gravitational forces on the workpiece,
   (b) and the pressure of hydraulic fluid supplied to said hydraulic means associated with said lower work supporting member is greater than that supplied to said hydraulic means associated with said upper work supporting member.

5. In a grinding machine of the type including a bed having mounted thereon work supporting means for supporting a workpiece in a generally horizontal position during a grinding operation, and a generally vertically disposed grinding wheel; a steady rest comprising:
   (a) a frame mounted on said bed in opposed alignment with said grinding wheel,
   (b) an upper work engaging member slidably carried by said frame for supporting a workpiece against horizontal forces which occur during a grinding operation,
   (c) a lower work engaging member carried by said frame for supporting a workpiece against vertical forces acting thereon during a grinding operation,
   (d) hydraulic means for positioning and holding said work engaging members in supporting engagement with a workpiece,
   (e) a supply of fluid under pressure,
   (f) fluid supplying means including a valve for alternately directing fluid under pressure from said source to said hydraulic means to facilitate the advancement and retraction of said work engaging members, (g) a gauge for determining the end of a grinding operation, (h) and means actuated by said gauge to shift said valve to a position to stop the advance of said work engaging members and also to prevent reversal of said work engaging members.

6. The steady rest of claim 5 wherein:

(a) there are further means operable thereafter to shift said valve to a position to retract said work engaging members.

7. The steady rest of claim 5 wherein:

(a) there are further means operable to shift said valve to a position to retract said work engaging members after retraction of said grinding wheel is initiated.

8. The steady rest of claim 5 wherein (a) said fluid supplying means includes means for separately supplying fluid to each of said hydraulic means, (b) and means for regulating the pressure of said fluid supplied to each of said hydraulic means in accordance with the forces acting on said respective work engaging members.

References Cited

UNITED STATES PATENTS

| | | | |
|---|---|---|---|
| 2,949,708 | 8/1960 | Wiatt | 51—238.1X |
| 3,076,296 | 2/1963 | Joyce | 51—165.04 |
| 3,233,368 | 2/1966 | Price | 51—238.1X |
| 3,391,500 | 7/1968 | Messier | 51—238.1 |

ANDREW R. JUHASZ, Primary Examiner

D. D. EVENSON, Assistant Examiner

U.S. Cl. X.R.

82—38